(12) United States Patent
Beardsley et al.

(10) Patent No.: US 12,060,443 B2
(45) Date of Patent: Aug. 13, 2024

(54) PROCESS

(71) Applicant: INEOS USA LLC, League City, TX (US)

(72) Inventors: William E. Beardsley, Richmond Hill, GA (US); Robert Topliss, Decatur, AL (US); James H. Lee, Naperville, IL (US); William D. Stephens, Batavia, IL (US)

(73) Assignee: INEOS USA LLC, League City, TX (US)

( * ) Notice: Subject to any disclaimer, the term of this patent is extended or adjusted under 35 U.S.C. 154(b) by 249 days.

(21) Appl. No.: 17/547,029

(22) Filed: Dec. 9, 2021

(65) Prior Publication Data

US 2023/0183397 A1 Jun. 15, 2023

(51) Int. Cl.
  *C08F 110/06* (2006.01)
  *C08F 2/34* (2006.01)
  *C08F 2/38* (2006.01)
  *C08F 2/42* (2006.01)

(52) U.S. Cl.
  CPC ............ *C08F 110/06* (2013.01); *C08F 2/34* (2013.01); *C08F 2/38* (2013.01); *C08F 2/42* (2013.01)

(58) Field of Classification Search
  CPC ...... C08F 2/34; C08F 2/01; C08F 2/38; C08F 2/42; C08F 110/06; C08F 10/06; C08F 10/00
  See application file for complete search history.

(56) References Cited

U.S. PATENT DOCUMENTS

| | | | |
|---|---|---|---|
| 3,957,448 A | 5/1976 | Shepard et al. | |
| 3,965,083 A | 6/1976 | Jezl et al. | |
| 3,971,768 A | 7/1976 | Peters et al. | |
| 4,129,701 A | 12/1978 | Jezl et al. | |
| 5,504,166 A | 4/1996 | Buchelli et al. | |
| 6,069,212 A | 5/2000 | Hung et al. | |
| 6,458,900 B1 * | 10/2002 | Aittamaa | B01J 19/2475 526/71 |
| 6,559,348 B1 * | 5/2003 | Aittamaa | C01B 3/501 95/55 |
| 6,753,390 B2 | 6/2004 | Ehrman et al. | |
| 8,658,744 B2 | 2/2014 | Van Der Ham et al. | |
| 10,266,625 B2 * | 4/2019 | Wang | B01J 8/44 |
| 10,745,499 B2 * | 8/2020 | Banat | C08F 2/34 |
| 10,822,435 B2 * | 11/2020 | Banat | B01J 19/242 |
| 11,155,652 B2 * | 10/2021 | Fischer | C08F 10/02 |
| 2010/0144981 A1 | 6/2010 | Savatsky et al. | |
| 2016/0115254 A1 | 4/2016 | Aso et al. | |

FOREIGN PATENT DOCUMENTS

| | | |
|---|---|---|
| CN | 108586644 A | 9/2018 |
| CN | 111875726 A | 11/2020 |
| WO | WO-2011/155999 A1 | 12/2011 |
| WO | WO-2015/022025 A1 | 2/2015 |

OTHER PUBLICATIONS

International Search Report and Written Opinion Foreign Search Report Dated Mar. 17, 2023, 12 pages.
Great Britain search report dated Jul. 11, 2022.

* cited by examiner

*Primary Examiner* — Rip A Lee
(74) *Attorney, Agent, or Firm* — Foley & Lardner LLP

(57) ABSTRACT

The present invention relates to the polymerisation of one or more monomers in a gas phase reactor, and in particular provides a process for from the polymerisation of one or more monomers in a horizontal stirred bed gas phase reactor, wherein the process comprises:
  a. Polymerising a mixture comprising one or more monomers and hydrogen in the reactor to produce the polymer,
  b. Withdrawing from the reactor a gaseous stream,
  c. Passing the gaseous stream to a condenser in which it is partly condensed to produce a liquid phase and a remaining vapour phase,
  d. Passing the mixture of liquid phase and remaining vapour from the condenser to a separator in which there is maintained a liquid phase and a vapour phase, the volume of the liquid phase in the separator being a percentage, X, which is between 10 and 80% of the total volume of the separator,
  e. And recycling both liquid and vapour from the separator to the reactor, the mass rate of liquid returning to the reactor being L and the mass rate of vapour returning to the reactor being V, the two defining a ratio V/L, characterised in that the hydrogen concentration in the reactor is changed and the change is effected at least in part by changing the V/L ratio by at least 10% and/or by changing the volume, X.

23 Claims, No Drawings

PROCESS

The present invention relates to the polymerisation of one or more monomers in a gas phase reactor.

The polymerisation of one or more monomers in gas phase reactors is well-known. A known process, particularly for propylene polymerisations, for example, is the reaction of one or more monomers in a stirred bed reactor, and particularly a horizontal stirred bed reactor.

In the polymerisation of propylene in a horizontal stirred bed reactor a bed of propylene polymer is maintained in an agitated state in the reactor. Above and within the bed is a gas phase comprising unreacted propylene and other reactants, such as comonomers and hydrogen. The polymerisation reaction is highly exothermic, and to keep the reaction at the desired temperature it is known to withdraw the gas and cool it prior to recycling. It is in particular common to partially condense the propylene and other condensable components, and recycle to the reactor both a cooled vapour phase, which is usually passed to the bottom of the reactor so it can pass up through the polymer bed, and a condensed liquid phase, which is usually sprayed onto the top of the polymer bed. Catalyst and fresh monomer are introduced to the reactor, whilst produced polymer is withdrawn to maintain the bed volume. CN111875726A, for example, describes a method for polypropylene production carried out through an Innovene gas-phase polypropylene process, and the ratio of vapour to liquid (V/L) of the circulating gas mass flow rate to the liquid mass flow rate of a first reaction region in a first reactor is not greater than 0.02.

The polymer properties are controlled by, among other factors, the presence of comonomers and hydrogen. Hydrogen, in particular, is used to control the melt flow rate (MFR) of the produced polymer, with, all else being equal, higher hydrogen concentrations leading to polymers with higher MFR. It is common for a commercial polymerisation reactor to produce a range of different polymer products, or grades, which have use in different applications. The change from production of one polymer with a particular set of properties to another with a different set of properties is known as a transition. Transitions are generally achieved by changing the conditions, catalyst and/or catalyst components (e.g. co-catalysts and external donors) in the reactor to obtain the newly desired product. As noted above, one parameter which can be used to change the product being produced is the hydrogen concentration in the reactor.

A problem with changing hydrogen concentrations is that, in general, hydrogen is consumed fairly slowly in a polymerisation process. Thus, reductions in hydrogen concentration via reaction can take a considerable time. This can lead to significant periods of production where material which is not of a desired set of properties (or "off specification") is produced.

A solution to speed up the transition is to vent large quantities of the reactor gas, and hence the hydrogen, from the reactor, or more commonly, from the effluent downstream of a partial condenser. But the venting of reactor gas results in removal also of desirable propylene and other hydrocarbons. If the vent stream is flared this is both a significant cost and also undesirable for environmental reasons. Even if the stream is treated to recover the hydrocarbons for recycle or use elsewhere this is still at a significant cost.

The Applicants have now found a process that significantly speeds the change of hydrogen concentration in the reactor, and hence also of transitions, whilst avoiding or at least significantly reducing the amount of gas which needs to be vented.

Thus, in a first aspect the present invention provides a process for the polymerisation of one or more monomers in a horizontal stirred bed gas phase reactor, wherein the process comprises:
  a. Polymerising a mixture comprising one or more monomers and hydrogen in the reactor to produce the polymer,
  b. Withdrawing from the reactor a gaseous stream,
  c. Passing the gaseous stream to a condenser in which it is partly condensed to produce a liquid phase and a remaining vapour phase,
  d. Passing the mixture of liquid phase and remaining vapour from the condenser to a separator in which there is maintained a liquid phase and a vapour phase, the volume of the liquid phase in the separator being a percentage, X, which is between 10 and 80% of the total volume of the separator,
  e. And recycling both liquid and vapour from the separator to the reactor, the mass rate of liquid returning to the reactor being L and the mass rate of vapour returning to the reactor being V, the two defining a ratio V/L,
characterised in that the hydrogen concentration in the reactor is changed and the change is effected at least in part by changing the V/L ratio by at least 10% and/or by changing the volume, X.

The present invention is applicable to any change in hydrogen concentration in the reactor. Generally, however, the change in hydrogen concentration will result in a change in the polymer produced, and in particular is likely to be desired specifically as part of a transition to production of a different polymer product.

Thus, in a second aspect, which is also a preferred embodiment of the first aspect, the present invention provides a process for transitioning from the production of a first polymer to production of a second polymer in a horizontal stirred bed gas phase reactor, wherein production of each polymer comprises:
  a. Polymerising a mixture comprising one or more monomers and hydrogen in the reactor to produce the polymer,
  b. Withdrawing from the reactor a gaseous stream,
  c. Passing the gaseous stream to a condenser in which it is partly condensed to produce a liquid phase and a remaining vapour phase,
  d. Passing the mixture of liquid phase and remaining vapour from the condenser to a separator in which there is maintained a liquid phase and a vapour phase, the volume of the liquid phase in the separator being a percentage, X, which is between 10 and 80% of the total volume of the separator,
  e. And recycling both liquid and vapour from the separator to the reactor, the mass rate of liquid returning to the reactor being L and the mass rate of vapour returning to the reactor being V, the two defining a ratio V/L,
characterised in that the hydrogen concentration in the reactor is changed between the production of the first polymer and production of the second polymer and the change is effected at least in part by changing the V/L ratio by at least 10% and/or by changing the volume, X, compared to the values used during production of the first polymer.

The present invention may be applied when either an increase or a decrease in the hydrogen concentration is desired. However, the invention is most useful when a reduction in hydrogen concentration in the reactor is desired.

In particular, it is the removal of hydrogen from the reactor which is time consuming and/or results in loss of monomer and other hydrocarbons as described above.

The gas phase reactor may be any suitable gas phase reactor but is preferably a horizontal stirred bed reactor. Such reactors are well known, for example as described in WO 2011/155999. The reactor in the present invention may be a single ("stand alone") reactor, or may be one of two or more reactors, especially two or more horizontal stirred bed reactors, operated in series or in parallel. Series operation of two reactors is described, for example, in U.S. Pat. No. 6,069,212. Where two or more reactors are present then the present invention can be applied in any or all reactors as required. In a preferred embodiment the present invention is applied in at least the first reactor of two or more horizontal stirred bed reactors operated in series.

It should be noted, and as described in WO 2011/155999, each gas phase reactor may comprise several sections or zones. Typically, for example, there may be first section or zone at one end, and a final section or zone at the other end where polymer is withdrawn. In CN111875726A the ratio of vapour to liquid (V/L) fed to the first zone is controlled, and the ratio fed to each zone may differ. In the present invention the ratio V/L represents the ratio of the mass rate of vapour returning to the reactor, V, to the mass rate of liquid returning to the reactor, L. Each of V and L represent the total mass rate which is passed to the reactor.

The mixture to be polymerised comprises one or more monomers and hydrogen. The present invention is most preferably applied to the production of polypropylene, in which case the one or more monomers comprises propylene. Monomers other than propylene may be present as comonomers, with ethylene and 1-butene being suitable examples.

The reactor (excluding the stirrer, any settling domes and any internals) typically has an internal volume of between 50 and 250 $m^3$. During polymerisation typically between 25 and 80% of this volume is occupied by polymer present as a bed of polymer solids in the reactor, whilst 20-75% of the volume is gas volume (to include both the gas above the bed of polymer and also within the bed between the polymer particles). Typically, one or more, such as one or two settling domes are mounted on the top of the reactor.

The separator is typically in the form of a drum/cylinder. The separator typically has a volume between 25% and 90% of the total volume of the reactor and settling domes. The orientation of the separator is not especially critical—for example the separator may be orientated horizontally or vertically. Typically the separator has a liquid outlet in the lower part. The liquid outlet is generally located below any minimum liquid level that may be present. It is most preferably located at or near the bottom of the separator. Typically the separator has a vapour outlet in the upper part. The vapour outlet is generally located above any maximum liquid level that may be present. It is most preferably located at or near the top of the separator. The inlet for the vapour and condensed liquid from the condenser is also usually arranged to be above the maximum liquid level in the separator, and preferably also located at or near the top of the separator.

The reactor, condenser, separator and connecting pipework (including pumps, valves etc.) may be considered as a reactor system. With regards to the present invention, the Applicants have found that although the volume of the vapour phase present in the separator is relatively small compared to the volume of vapour phase in the reactor, during the condensation of the gaseous stream the vast majority of hydrogen stays in the vapour phase of the partially condensed mixture. Hence the hydrogen concentration in the vapour phase in the separator is much higher than the concentration of hydrogen in the reactor, and the inventory, by which is meant the total mass, of hydrogen in the separator can be much higher than found in the reactor.

In the first option a change in hydrogen concentration is effected at least in part by changing the V/L ratio by at least 10%. (This change is defined relative to the V/L ratio just before it is changed.) In general, the desired mass rate of liquid to the reactor, L, is determined by the heat to be removed, which itself is defined by the production rate (i.e. the rate of polymerisation). At steady state, and with a particular liquid mass rate to the reactor, L, then the gas flow rate, V, is controlled relative to the liquid mass rate to give the required V/L. Generally, at steady state an amount of gaseous phase is then withdrawn from the reactor (to maintain the reactor pressure), and this is then cooled to provide an equivalent amount of condensed liquid and (remaining) vapour to "replace" that passed to the reactor. The returned material plus any make-up monomer maintains the liquid level in the separator.

In general, when a change in V/L ratio is desired, the vapour recycle rate is adjusted to obtain the new V/L. (The mass rate of liquid can in theory also be adjusted, but typically this is done only by changing the production rate.)

It has been found that a decrease in the V/L ratio, meaning that the relative amount of vapour which is recycled compared to liquid is decreased, results in a higher concentration of hydrogen collecting in the vapour phase in the separator, thereby resulting in a net withdrawal of hydrogen from the reactor into the separator. This can result in a significant reduction in hydrogen concentration in the reactor. Further, the residence time of vapour in the reactor is generally quite low (of the order of 2-15 minutes, such as 5-10 minutes at typical commercial production rates) which means the reduction of hydrogen in the reactor can occur very quickly by adjusting the V/L ratio according to the present invention.

The opposite effect, namely a relatively rapid increase in hydrogen concentration in the reactor can be achieved by increasing the V/L ratio.

The change in hydrogen due to a change in V/L is most effective where a relatively large change in V/L can be performed. However, the minimum V/L ratio can be limited by the approach of the condensing end point to the cooling water temperature.

The V/L just before the change (hereinafter "initial V/L") may be any suitable value. Typically the initial V/L may be, depending on the reactor configuration, between 0.025 and 2, with an initial V/L between 0.025 and 0.75 most preferred. The "changed" V/L is typically also within this same range (and preferred range), subject to the requirement in the present invention that the V/L ratio is changed by at least 10% from the initial condition. In a preferred embodiment the V/L ratio is changed by more than 20% from the initial condition. For example, if the initial V/L ratio is 0.50 and the V/L is to be reduced, the V/L is changed to below 0.45, and more preferably to below 0.40. Conversely, if the initial V/L ratio is 0.40 and the V/L is to be increased, the V/L is changed to above 0.44, and more preferably to above 0.48.

In one embodiment the V/L is varied in the range from 0.30 to 0.60, such as in the range 0.40 to 0.60. For example, the initial V/L may be between 0.50 and 0.60, such as in the range 0.55 to 0.60, and is reduced to a value between 0.40 and 0.50, such as in the range 0.40 to 0.45.

In a preferred embodiment the V/L is varied in the range 0.08 to 0.25, for example in the range 0.10 to 0.20. For example, the initial V/L may be between 0.15 and 0.25, such as in the range 0.17 to 0.23, and is reduced to a value between 0.10 and 0.15, such as in the range 0.10 to 0.13. It will be apparent that the relative change, for example from 0.25 to 0.10 is greater than the relative change from 0.60 to 0.40, and hence a much larger effect can be achieved at these lower V/L ranges.

The second option in the present invention involves changing the fill or liquid volume present in the separator. Reducing the liquid volume in the separator results in an increased volume of vapour in the separator. Depending upon the relative sizes of the reactor and separator, the separator can contain the vast majority of the hydrogen in the reactor system. The amount of hydrogen in the separator increases with an increasing volume of vapour space in the separator. The volume of liquid in the separator can be reduced by reducing, or even stopping, the addition of make-up monomer to the reactor system so that less monomer is fed to the reactor loop than is consumed by the reaction. This can reduce the level in the separator by a meaningful amount in about 10-20 minutes, such as 10-15 minutes at typical commercial production rates. Whilst usually not as rapid as changing the V/L level generally a larger change in hydrogen concentration can be effected changing the volume of liquid in the separator.

The opposite effect, namely an increase in hydrogen concentration in the reactor can be achieved by increasing the liquid volume, X, by adding more monomer to the reactor loop than is consumed by the reaction.

As with the V/L, the change in hydrogen due to a change in volume (X) is most effective where a relatively large change in the volume can be performed. The volume of the liquid phase in the separator is generally limited only by interlocks or other limits defined to ensure a minimum amount of liquid but not too much liquid can be present in the separator. In the present invention the volume, X, is between 10 and 80% of the total volume of the separator. Preferably X is at least 20% of the total volume of the separator, for example, in the range from 20% to 70% of the total volume of the separator.

In a preferred embodiment the volume X is changed by more than 10% from its volume just before the change (hereinafter the "initial X"), such as more than 20% from the initial X. For example, if the initial X is 50% and is to be reduced, X is preferably changed to below 45%, and more preferably to below 40%. Conversely, if the initial X is 50% and is to be increased, X is preferably changed to above 55%, and more preferably to above 60%.

In a preferred embodiment, the volume, X, is reduced to effect a reduction in hydrogen concentration in the reactor, and most preferably the volume X is reduced from a value of greater than or equal to 40%, such as 50% or greater, to a volume less than or equal to 40%, such as 30% or less.

It will be apparent that either or both the V/L and X may be adjusted to effect the change in hydrogen concentration as necessary and in the most time effective manner depending on the extent of change desired.

In a preferred embodiment at least the V/L ratio is decreased to effect a reduction in hydrogen concentration in the reactor. As an example, the V/L may initially be at a value above 0.15, such as 0.18 or above, and may be reduced to a value below 0.15, such as 0.12 or below.

In another preferred embodiment at least the volume, X, is reduced to effect a reduction in hydrogen concentration in the reactor. As an example, the volume X may initially be at a volume of greater than or equal to 40%, such as 50% or greater, and may be reduced to a volume less than or equal to 40%, such as 30% or less.

A particular advantage of the present invention is the relatively rapid change in hydrogen concentration in the reactor obtainable. In general, in the present invention the desired changed concentration of hydrogen in the reactor can be obtained within 60 minutes, preferably within 30 minutes, such as within 15 minutes, from the change of V/L and/or X.

In relation to a transition, in particular, it will be apparent that the change in the V/L ratio and/or the change in the volume, X, to effect the change in hydrogen concentration in the reactor should be done at the start of the transition or close to the start of the transition, such as within 15 minutes of the start of the transition.

As already noted, the term "transition" refers to a change from production of a first polymer to production of a second polymer with a different set of properties to the first polymer. In the present invention the concentration of hydrogen is changed in the reactor. Thus, when the present invention applied in a transition typically the melt flow rate (MFR) of the second polymer will be different to that of the first polymer. The MFR of the second polymer typically differs by at least 10%, and preferably at least 20% from the first polymer (defined relative to the first polymer).

As will be discussed further, additional steps may be taken prior to the change in the hydrogen concentration in the reactor according to the invention and during which the first polymer continues to be produced i.e. with no change in MFR. In general, although such additional steps may be taken in anticipation of the subsequent transition/change in hydrogen concentration, as used herein the start of the transition is the time when the conditions in the reactor are changed in such a way that a polymer with a different MFR is deliberately being produced. This is, in particular in the present invention, when the change in hydrogen concentration in the reactor actually starts.

In addition, after the change in V/L and/or X according to the present invention, the process may be continued with the altered values. Alternatively, it is possible to return the V/L and/or X to the initial values or to other desired values. In particular, after the desired changed concentration of hydrogen in the reactor is achieved the V/L and/or X can be changed whilst maintaining the desired changed concentration of hydrogen in the reactor. This generally is achieved over a longer period of time, such as 2 to 48 hours.

For example, if the V/L ratio has been decreased to reduce the concentration of hydrogen in the reactor this has, as noted above, resulted in an increased hydrogen inventory in the gas phase in the separator. Some or all of this increased inventory of hydrogen in the separator can be recycled to the reactor over time (over several hours or even days) as the hydrogen in the process is consumed, allowing the V/L to be increased again. (And, in particular, V can be increased without increasing hydrogen concentration in the reactor as the hydrogen concentration in the vapour phase in the separator reduces over time.)

Similarly, if the volume of liquid in the separator has been reduced this also results in an increased inventory of hydrogen in the separator, in particular as an increased volume of vapour in the separator. Again, some or all of this increased inventory in the separator can be recycled to the reactor over time (over several hours or even days) as the hydrogen in the process is consumed, in this case allowing the liquid volume, X, to be increased again.

For avoidance of doubt, where the present invention is applied during a transition, then after the change in hydrogen concentration as claimed a second polymer with desired MFR is being produced. After this time the V/L and/or X may be further varied as noted above, but during such steps the second polymer should continue to be produced i.e. with no change in MFR. Any such period is therefore considered to be after the end of the transition.

EXAMPLES

The following examples are performed in a horizontal stirred bed reactor. The reactor has a diameter of 2.7 metres. The volume of the reactor and attached settling domes is 117.2 m$^3$. During polymerisation the volume of gas in the reactor and connecting pipes and equipment at the reactor gas composition is approximately 129 m$^3$. The separator has a volume of approximately 99 m$^3$. (There is also an additional 4 m$^3$ of connecting pipes and equipment at the separator for a total volume of 103 m$^3$ at separator conditions.)

Initial Conditions

A propylene homopolymer is initially being produced having an MFR of 30 and with a ratio of hydrogen to propylene of 5.0 mol %. This corresponds to an inventory of 12.7 kg of hydrogen in the reactor and connected pipes and equipment.

The withdrawn gaseous stream is passed to a condenser in which it is partly condensed to produce a liquid phase and a remaining vapour phase.

The mixture of liquid phase and remaining vapour from the condenser is passed to a separator in which there is maintained a liquid phase and a vapour phase, the liquid phase having a volume, X, of 60% of the separator volume.

The vapour phase in the separator comprises 15.1 kg of hydrogen, while the liquid phase contains 9.3 kg. The total hydrogen inventory in the reactor system is therefore about 37.1 kg.

Liquid and vapour are at this stage (i.e. during steady state production of the first polymer) returned from the separator to the reactor, with a V/L of 0.18.

Example 1-Change of V/L

In this Example the hydrogen concentration in the reactor is reduced by reducing the V/L ratio.

In particular, the amount of vapour being recycled to the reactor is reduced to reduce the V/L to 0.12. Under these conditions and with the same total hydrogen inventory of 37.1 kg, less hydrogen is recycled to the reactor reducing the concentration therein, whilst approximately 1.5 kg of hydrogen transfers from the reactor to the separator. The result is that the catalyst now produces a propylene polymer with MFR of about 23.

This change is achieved in about 5-10 minutes.

Example 2-Change of X

In this Example it is desired to further reduce the hydrogen concentration in the reactor using the volume of liquid, X, in the separator.

In particular, after the V/L is reduced to 0.12 as in Example 1, the liquid volume in the separator is then reduced from 60% to 20%. This is achieved by stopping the feed of fresh propylene to the process whilst maintaining the liquid mass rate to the reactor, such that the propylene inventory in the separator is reduced. Under these conditions and again with the total hydrogen inventory of 37.1 kg, a further 3.4 kg of hydrogen transfers from the reactor to the separator, resulting in production of a propylene polymer with MFR of about 15.

In this Example this change is achieved in about a further 15 minutes. In practice, this change could be started simultaneously with, or even prior to, the change in V/L in Example 1.

These Examples show the effects of adjusting the value of V/L (Example 1 compared to the initial conditions), adjusting the value of X (Example 2 compared to Example 1) and by the combined adjustment of both V/L and X (Example 2 compared to the initial conditions), showing rapid reduction of hydrogen concentration in the reactor is possible without venting of the reactor.

This demonstrates that in a transition a rapid reduction in hydrogen in the reactor, and hence in MFR, can be achieved by changing the V/L ratio and/or the amount of liquid in the separator.

Example 3-Additional Steps

Further reductions in hydrogen concentration in the reactor and therefore in the MFR of the product produced after a transition can be obtained by one or more of the following:
i) Further reductions in V/L and/or X.
ii) Building up V/L and/or X to higher initial values without changing the reactor concentration before starting the transition to reduce the initial hydrogen inventory in the separator. (This would generally be done over a number of hours prior to the transition.)
iii) Allowing the hydrogen to react out of the system in a conventional manner. In this case the time required for this is much reduced compared to a process starting with 12.7 kg hydrogen in the reactor and not using the present invention.
iv) Venting some of the reactor gas in a conventional manner. In this latter case less venting is required than in the absence of the present invention. If venting is applied it is preferably applied to the separator overhead stream after the present invention has been applied since this then has the maximum hydrogen concentration. It can however also be applied at any time.

The present example illustrates an embodiment of the second option above where the V/L is increased to higher initial values without changing the H2 concentration in the reactor, which step takes place before starting a transition, and then reducing the V/L during the transition according to the claimed invention.

The following steps are performed:
1. Whilst producing a first polymer product the feed of fresh H2 to the reactor system is stopped. To compensate for the absence of fresh H2 being fed and to maintain production of the same grade of polymer (maintain the same H2 to propylene ratio in the reactor and hence the same MFR of product), the V/L ratio is increased by recycling a larger mass rate of vapour to the reactor (V). In particular, more vapour is circulated to the reactor to ensure it still receives the same flow of hydrogen.
2. As the H2 in the system is consumed the concentration in the recycled vapour reduces. The V/L is further increased to keep making the same grade (first polymer). During this time the total H2 inventory in the reactor system is continuously decreasing as H2 is consumed.
3. When the transition is desired, the V/L is reduced, and in particular by decreasing the mass rate of vapour to the reactor (V). After this reduction there is now being introduced into the reactor vapour with a low H2 concentration and at low gas flow rate, so the reactor sees a large reduction in H2. The reaction rapidly changes to making the desired low MFR second polymer product.

4. In some embodiments, the reduction in step (3) may be to a V/L lower than that at "normal" operating conditions for the second polymer. In this case, after step (3) the mass rate of vapour, V, and the V/L may be slowly increased back to the desired V/L. This is again done whilst keeping the H2 to propylene ratio in the reactor at the desired value for the MFR for the second polymer.

6. Once the desired V/L is reached adjustment of the V/L ratio is stopped and feeding of the fresh H2 is restarted.

These steps are particularly advantageous where the second polymer is produced with a concentration of hydrogen in the reactor much lower than required for the first polymer, and in particular allows the total hydrogen inventory in the system to be reduced in advance of the actual transition.

The invention claimed is:

1. A process for the polymerisation of one or more monomers in a gas phase reactor, wherein the process comprises:
   a. polymerising a mixture comprising one or more monomers and hydrogen H2 in the gas phase reactor to produce a polymer,
   b. withdrawing from the gas phase reactor a gaseous stream,
   c. passing the gaseous stream to a condenser in which it is partly condensed to produce a liquid phase and a remaining vapour phase,
   d. passing a mixture of liquid phase and remaining vapour from the condenser to a separator in which there is maintained a liquid phase and a vapour phase, a volume of the liquid phase in the separator being a percentage, X, which is between 10 and 80% of a total volume of the separator, and
   e. recycling both liquid and vapour from the separator to the gas phase reactor, a mass rate of liquid returning to the gas phase reactor being L and a mass rate of vapour returning to the gas phase reactor being V, the two defining a ratio V/L,
   wherein a hydrogen concentration in the gas phase reactor is changed and the change is effected at least in part by changing the V/L ratio by at least 10% and/or by changing the volume of the liquid phase, X.

2. A process as claimed in claim 1 wherein the V/L ratio is decreased to effect a reduction in hydrogen concentration in the gas phase reactor.

3. A process as claimed in claim 2 wherein the V/L ratio is decreased from a value above 0.15 to one below 0.15.

4. A process as claimed in claim 1 wherein the V/L ratio is changed by more than 20% from an initial condition.

5. A process as claimed in claim 1 wherein the volume, X, is reduced to effect a reduction in hydrogen concentration in the gas phase reactor.

6. A process as claimed in claim 5 wherein the volume X is reduced from a value of greater than or equal to 40% to a volume less than 40%.

7. A process as claimed in claim 1 wherein the volume X is changed by more than 10% from an initial condition.

8. A process as claimed in claim 1 wherein a desired changed concentration of hydrogen in the gas phase reactor is obtained in less than 60 minutes from an initial change of V/L ratio and/or X.

9. A process as claimed in claim 1 wherein after a desired changed concentration of hydrogen in the gas phase reactor is achieved the V/L ratio and/or X are changed back to their original values while maintaining the desired changed concentration of hydrogen in the gas phase reactor.

10. A process as claimed in claim 9 wherein the V/L ratio and/or X are changed back to their original values over a period of 2 to 48 hours.

11. A process as claimed in claim 1 which is a process for transitioning from the production of a first polymer to production of a second polymer in a gas phase reactor in which the hydrogen concentration in the gas phase reactor is changed between the production of the first polymer and production of the second polymer, wherein, prior to the transition, the V/L ratio and/or X are increased to higher initial values without changing the gas phase reactor hydrogen concentration and so as to still produce the first polymer.

12. A process as claimed in claim 11 which comprises the following steps prior to the transition:
   a) a feed of fresh H2 to the polymerisation process is stopped and the V/L ratio is increased by increasing (V), the mass rate of vapour returned to the gas phase reactor, to continue production of the first polymer,
   b) as the H2 in the polymerisation process is consumed the V/L ratio is further increased to continue production of the first polymer while a total H2 inventory in the polymerisation process is decreasing.

13. A process as claimed in claim 12, which comprises, during the transition, reducing the V/L ratio to a first value and transitioning to production of the second polymer, and thereafter increasing the mass rate of vapour flow returning to the gas phase reactor (V) and the V/L ratio while continuing production of the second polymer.

14. A process for transitioning from the production of a first polymer to production of a second polymer in a gas phase reactor, wherein production of each polymer comprises:
   a. polymerising a mixture comprising one or more monomers and hydrogen in the gas phase reactor to produce a polymer,
   b. withdrawing from the gas phase reactor a gaseous stream,
   c. passing the gaseous stream to a condenser in which it is partly condensed to produce a liquid phase and a remaining vapour phase,
   d. passing a mixture of liquid phase and remaining vapour from the condenser to a separator in which there is maintained a liquid phase and a vapour phase, a volume of the liquid phase in the separator being a percentage, X, which is between 10 and 80% of a total volume of the separator, and
   e. recycling both liquid and vapour from the separator to the gas phase reactor, a mass rate of liquid returning to the gas phase reactor being L and a mass rate of vapour returning to the gas phase reactor being V, the two defining a ratio V/L,
   wherein a hydrogen concentration in the gas phase reactor is changed between the production of the first polymer and production of the second polymer and the change is effected at least in part by changing the V/L ratio by at least 10% and/or by changing the volume of the liquid phase, X, compared to the values used during production of the first polymer.

15. A process as claimed in claim 14 wherein the V/L ratio is decreased to effect a reduction in hydrogen concentration in the gas phase reactor.

16. A process as claimed in claim 15 wherein the V/L ratio is decreased from a value above 0.15 to one below 0.15.

17. A process as claimed in claim 14 wherein the V/L ratio is changed by more than 20% from an initial condition.

18. A process as claimed in claim 14 wherein the volume, X, is reduced to effect a reduction in hydrogen concentration in the gas phase reactor.

19. A process as claimed in claim 18 wherein the volume X is reduced from a value of greater than or equal to 40% to a volume less than 40%.

20. A process as claimed in claim 14 wherein the volume X is changed by more than 10% from an initial condition.

21. A process as claimed in claim 14 wherein a desired changed concentration of hydrogen in the gas phase reactor is obtained in less than 60 minutes from an initial change of V/L ratio and/or X.

22. A process as claimed in claim 14 wherein after a desired changed concentration of hydrogen in the gas phase reactor is achieved, the V/L ratio and/or X are changed back to their original values while maintaining the desired changed concentration of hydrogen in the gas phase reactor.

23. A process as claimed in claim 22 wherein the V/L ratio and/or X are changed back to their original values over a period of 2 to 48 hours.

\* \* \* \* \*